J. B. BASSETT.
ROTARY CONVERTER.
APPLICATION FILED FEB. 18, 1916.
1,246,701.
Patented Nov. 13, 1917.
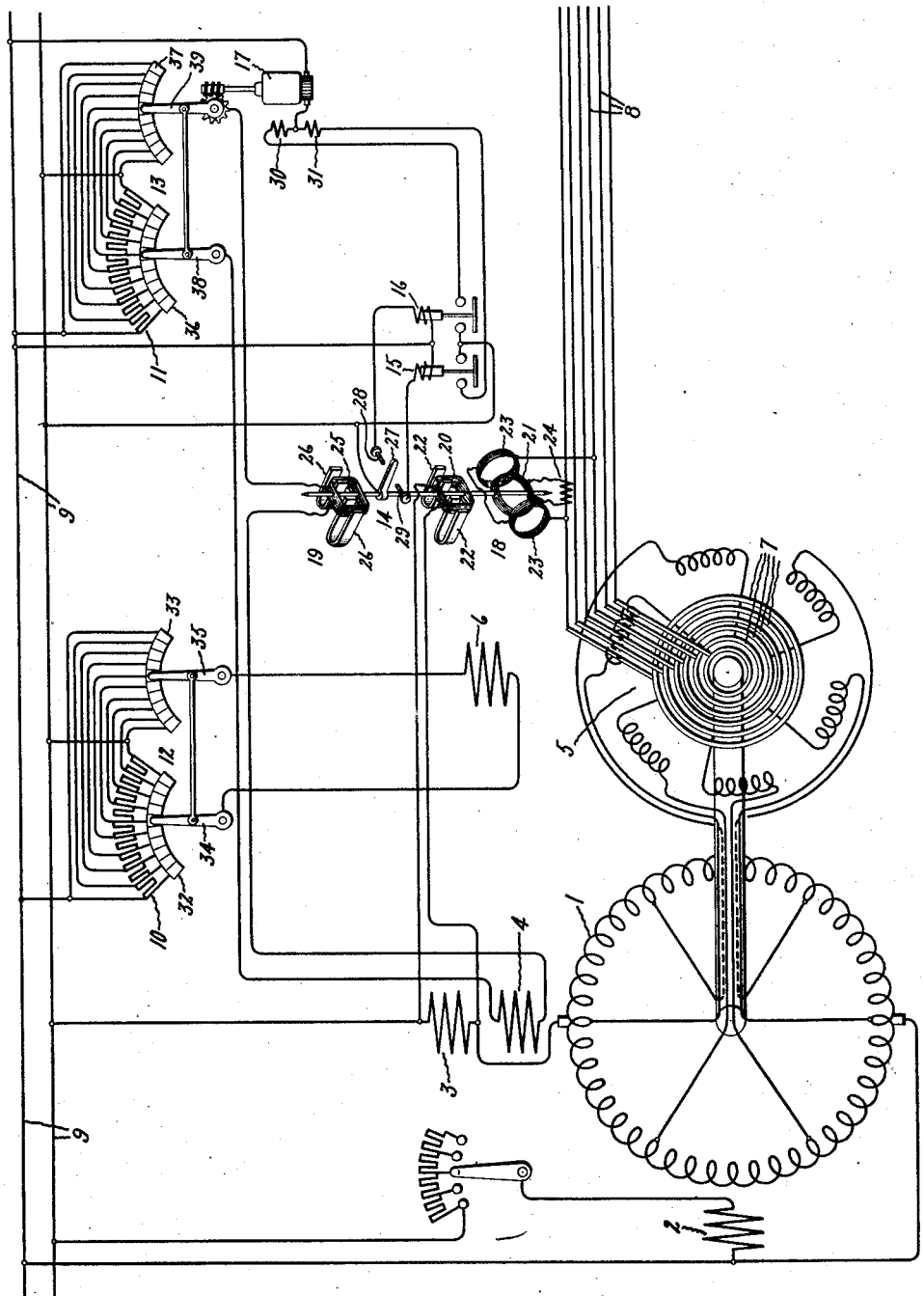
Inventor:
John B. Bassett,
by
His Attorney.

UNITED STATES PATENT OFFICE.

JOHN B. BASSETT, OF SCHENECTADY, NEW YORK, ASSIGNOR TO GENERAL ELECTRIC COMPANY, A CORPORATION OF NEW YORK.

ROTARY CONVERTER.

1,246,701.  Specification of Letters Patent.  Patented Nov. 13, 1917.

Application filed February 18, 1916. Serial No. 79,089.

*To all whom it may concern:*

Be it known that I, JOHN B. BASSETT, a citizen of the United States, residing at Schenectady, in the county of Schenectady, State of New Work, have invented certain new and useful Improvements in Rotary Converters, of which the following is a specification.

My invention relates to rotary converters, and particularly to rotary converters provided with commutating poles and operated in connection with boosters mechanically connected thereto, the field of the boosters being variable for the purpose of varying the ratio between the alternating and direct current voltages. When a booster is mechanically connected to a rotary converter it imposes a motor load on the converter when boosting and a generator load on the converter when bucking; or, in other words, when the booster is boosting the voltage of the converter it must be driven as a generator by the converter, but when operating to buck the converter voltage the booster operates as a motor transmitting mechanical energy to the converter. Under such conditions, the effective armature reaction of the rotary converter varies through wide limits and directly affects the magnetization of the commutating poles. The armature reaction caused by the booster when boosting the converter voltage is in a direction to add to the excitation of the commutating poles of the converter, whereas under the bucking condition the armature reaction caused by the booster is in a direction to subtract from the excitation of the commutating poles of the converter.

My invention has for its object the provision of a novel and simple arrangement by which the strength of the commutating field may be automatically adjusted to the correct value under all conditions of buck and boost. To this end, I provide means responsive to the alternating current supplied to the booster and to the direct current supplied by the rotary converter for controlling the commutating field of the converter. I preferably provide the converter with two commutating field windings, one of which is connected in series with the direct current brushes and the other of which is connected to a source of voltage which may be varied over the requisite range and also reversed if desired. I control this source of voltage by a device which comprises an element having a coil energized by the alternating current supplied to the booster and an opposing coil energized by the direct current supplied by the converter, and a balancing element having a coil energized by the current flowing in the commutating field winding which is connected to the above mentioned source of voltage. Such a device will be responsive to a torque proportional to the alternating current supplied to the booster minus a torque proportional to the direct current supplied by the converter. The device is so designed that if the booster is neither bucking or boosting the effect of the coil energized by the alternating current supplied the booster is equal and opposite to the effect of the coil energized by the direct current supplied by the converter. If, however, the booster is boosting, then for any (kilowatt) load, the alternating current supplied to the booster remains the same as before, but the direct current is reduced in accordance with the increase in the direct voltage of the converter, and similarly if the booster is bucking, the alternating current supplied to the booster remains the same but the direct current supplied by the converter is increased with the decrease in the direct voltage of the converter. The device will therefore be responsive to the increase or decrease of the direct current at any given (kilowatt) load from the value it would have at the same load if the booster was neither bucking or boosting. This change in the value of the direct current is proportional to the booster watts, or the motor or generator load of the booster imposed upon the converter, and consequently the device is responsive to a torque proportional to the motor or generator load imposed by the booster upon the converter. Since the armature reaction of the converter depends upon this load of the booster imposed upon the converter and also upon the current delivered by the converter, the commutating field strength will be varied in accordance with all these factors.

For a better understanding of my invention reference may be had to the following description taken in connection with the accompanying drawing in which the single figure shows diagrammatically one embodiment of my invention.

In the drawing, I have shown a rotary converter 1 having a main exciting winding 2, a series commutating field winding 3 and an auxiliary commutating field winding 4. The converter 1 is mechanically connected to a booster 5 having a field winding 6. The booster is shown as being of the synchronous type connected through collector rings 7 to alternating current mains 8 and having its alternating current windings connected to the armature windings of the converter. The armature of the converter is shown as being connected to the direct current mains 9 as is the auxiliary commutating field winding 4 and the booster field winding 6. The field of the booster may be varied and reversed by connecting its field winding to a source of voltage which may be varied over a wide range and reversed. This source of voltage comprises a set of resistances 10 connected across the direct current mains 9. The field produced by the auxiliary commutating field winding may be varied and reversed by connecting it to a source of voltage which may be varied over a wide range and reversed. This source of voltage also comprises a set of resistances 11 connected across the direct current mains 9. The sets of resistances 10 and 11 are preferably the resistance elements of double dial rheostats 12 and 13.

The movement of the double dial rheostat 13 is controlled by a contact making device 14 through solenoids 15 and 16 and a motor 17. The solenoids 15 and 16 constitute the energizing coils of electro-magnets which may be of any desired form. The device 14 comprises an element 18 and a balancing element 19. The element 18 has a coil 20 energized by the direct current supplied by the rotary converter and a coil 21 energized by the alternating current supplied to the booster. Associated with the coil 20 are permanent magnets 22, and associated with the coil 21 are coils 23 energized by the alternating voltage of the booster. This coil 21 is provided so that the torque developed between it and coils 23 will be proportional to the alternating current, since the voltage of the alternating current supply is substantially constant. The coil 20 is shown as being connected across the series commutating field winding 3, the coil 21 is shown as being connected to a current transformer 24 in one phase of the alternating current mains 8 and the coils 23 are connected across the same phase of the mains 8. The balancing element of the contact making device comprises a coil 25 energized by the current flowing in the circuit of the auxiliary commutating field winding 4, it being connected in the circuit of this winding. This element 19 also has permanent magnets 26. The contact making device has a movable contact 27 and stationary contacts 28 and 29 which control the circuits of the solenoids 15 and 16, which in turn control the motor 17. The motor 17 is provided with two series field windings 30 and 31, which are wound so that when one of these windings is connected in series with the armature of the motor, the motor runs in one direction, and when the other winding is connected in series with the motor the motor runs in the opposite direction. Each of the solenoids 15 and 16 have contacts which connect the motor with one or the other of the series field windings 30 or 31 to the direct current mains 9, the motor then driving the double dial rheostat 13 in one direction or the other for the purpose to be described hereinafter.

The set of resistances 10 of the double dial rheostat 12 is connected to two rows of contacts 32 and 33, the terminals of the booster field are connected to the arms 34 and 35 of this rheostat, these arms being rigidly connected together. When these arms engage the extreme left hand contacts, the full voltage of the mains is applied to this field winding in one direction. By moving the arms to adjacent contacts, a voltage less than that of the mains is applied to this field winding, a further movement of the arms toward the right still further decreases the voltage applied to the winding 6. When the arms engage the middle contacts, no voltage is applied to the winding 6. A further movement of the arms toward the right applies a voltage less than the line voltage to the winding 6 which is in the opposite direction to that which was applied when the arms engaged contacts to the left of the middle. As the arms approach the extreme right hand contacts, the voltage applied increases until they engage these latter contacts, when full voltage is applied to the winding 6 in the opposite direction to that applied when the arms engaged the extreme left hand contacts.

Similarly, the set of resistances 11 of the double dial rheostat 13 is connected to two rows of contacts 36 and 37, and the terminals of the auxiliary commutating field winding 4 are connected to the arms 38 and 39, which are rigidly connected together and engage the rolls of contacts 36 and 37. The voltage applied to the field winding 4 is varied and reversed as the arms 38 and 39 move from left to right as explained above in connection with the booster field winding 6.

The operation of my arrangement is as follows:

Assume now a definite load on the converter and that the arms 34, 35, 38 and 39 are in their mid positions, in which case no voltage is applied to either windings 6 or 4, and consequently no current flows in them. The booster 5 then neither bucks or boosts.

Under this condition the contact making device is so designed that the effect of the coil 21 of the element 18 energized by the alternating current supplied to the booster is equal but opposite to the effect produced by the coil 20 energized by the direct current supplied by the converter. In other words, the torque produced by the coils 21 and 23 is equal and opposite to the torque produced by the coil 20 and the permanent magnets 22, and therefore no torque is produced in the element 18. Similarly no current flows in the coil 25 of the balancing element and consequently the movable contact 27 stays in its mid position and does not close the circuit of either of the solenoids 15 or 16. If now it is desired to raise the voltage delivered by the rotary converter, the arms 34 and 35 are moved in such a direction that a voltage is applied to the field winding 6 of the booster, so that it operates as a generator. The voltage of the booster is now added to the alternating voltage of the mains 8 and consequently raises the voltage supplied by the converter. Assuming now that the converter is delivering the same (kilowatt) load as before, the direct current is reduced in accordance with the increase in the voltage of the converter, and the effect of the coil 21 of the element 18 of the contact making device is now greater than the effect produced by the coil 20, or in other words, the torque produced by the coils 21 and 23 is greater than the torque produced by the coil 20 and the magnets 22, causing the contact 27 to move so as to close the circuit of one or the other of the solenoids 15 or 16 through the contact 28 or 29, depending upon the electrical connections, thus connecting the motor 17 in series with one or the other of the field windings 30 or 31 to the direct current mains 9 and thereby move arms 38 and 39. A voltage is thereby applied to the auxiliary commutating field winding 4 so that the field produced by it opposes the field produced by the series commutating field winding 3. The arms 38 and 39 continue to move until (considering a constant load upon the converter) the current supplied the winding 4 is sufficient to produce a torque in the coil 25 of the balancing element 19 equal to the torque in the element 18 of the contact making device. This will cause the contact 27 to move and open the circuit of the solenoid 15 or 16 and the arms 38 and 39 will come to rest. If the load on the converter increases, the torque of the element 18 of the contact making device will again predominate and the solenoid which was previously energized will again be energized to increase the current in the commutating field winding 4, the arms 38 and 39 moving until a balance is again reached. If the load on the converter decreases, the torque of the balancing element 19 will predominate and the solenoid which was not previously energized will now be energized and will cause the arms 38 and 39 to move to decrease the voltage applied to the winding 4 until a balance is again reached. With the windings arranged as shown in the drawing the arms 38 and 39 are moved to the right of their mid position for the boost condition.

If it is desired to lower the voltage of the converter, the arms 34 and 35 are moved in the opposite direction from the mid position, in which case the booster operates as a motor and generates a voltage in the opposite direction to that generated when acting as a generator; that is, it acts to reduce the voltage of the alternating current mains 8 and thus lower the voltage supplied by the converter. Assuming now that the converter is delivering the same load as before, the torque produced by the coils 21 and 23 is less than the torque produced by the coil 20 and the magnet 22; causing the contact 27 to move so as to close the circuit of the solenoid which will set the motor 17 in operation in the direction to move the arms 38 and 39 so as to apply a voltage to the auxiliary commutating field winding 4 whereby the field produced by it assists the field produced by the series commutating field winding. An increase of load on the converter increases the strength of the auxiliary commutating field winding and a decrease in load decreases the strength of this field in the same way as described above in connection with the operation of the booster 5 as a generator.

By providing the double dial rheostat 12 with a great number of resistance elements, the amount of boost or buck may be regulated by very small steps, and by providing the double dial rheostat 13 with a great number of resistance elements and properly designing the motor 17 so that it moves the arms 38 and 39 at comparatively low speed, the strength of the commutating field may be accurately adjusted to take care of all variations in armature reaction of the converter due to the variations in motor or generator load of the booster and to the variations in load on the converter.

By providing the element 18 of the contact making device with coils 21 and 23 supplied with alternating current and alternating voltage, respectively, of the mains 8, this portion of the element 18 not only responds to a torque proportional to the alternating current, but if the power factor of the alternating current supplied the converter differs from unity, it responds to the watts supplied from the mains 8. This is advantageous because if the power factor differs from unity to any great extent, the contact making device would still be responsive to the booster watts.

Throughout the specification and claims I have spoken of the alternating current supplied to the booster, but I desire it to be understood that the alternating current supplied to the converter is the same as that supplied to the booster and the contact making device may be responsive to the alternating current supplied the converter. The booster 5 and rotary converter 1 are shown as six-phase machines, but it is evident that they may be of any number of phases. Under certain conditions the series commutating field winding may be dispensed with. The booster 5 is shown as being of the synchronous type, but obviously it might be of any well known type. I aim in the appended claims to cover all such modifications as well as any other modifications which do not depart from the spirit and scope of my invention.

What I claim as new and desire to secure by Letters Patent of the United States, is:—

1. In combination, a rotary converter having a commutating field winding, a booster mechanically connected thereto, means for varying the field of said booster, and means responsive to the alternating current supplied to said booster and to the direct current supplied by said rotary converter for controlling said commutating field.

2. In combination, a rotary converter having a series commutating field winding and an auxiliary commutating field winding, a booster mechanically connected to said converter, means for varying the field of said booster, and means responsive to the alternating current supplied to said booster and to the direct current supplied by said rotary converter for controlling the current in said auxiliary commutating field winding.

3. In combination, a rotary converter having a commutating field winding, a booster mechanically connected thereto, means for varying the field of said booster, and means responsive to the alternating current and alternating voltage supplied to said booster and to the direct current supplied by said rotary converter for controlling said commutating field.

4. In combination, a rotary converter having a series commutating field winding and an auxiliary commutating field winding, a booster mechanically connected to said converter, means for varying the field of said booster, and means responsive to the alternating current and the alternating voltage supplied to said booster and to the direct current supplied by said rotary converter for controlling the current in said auxiliary commutating field winding.

5. In combination, a rotary converter having a commutating field winding, a booster mechanically connected thereto, means for varying the field of said booster, means for varying the field produced by said commutating field winding, and means for controlling said last mentioned means comprising a contact making device having coils energized by the alternating current supplied to said booster and by the direct current supplied by said rotary converter.

6. In combination, a rotary converter having a commutating field winding, a booster mechanically connected thereto, means for varying the field of said booster, means for varying the field produced by said commutating field winding, and means for controlling said last mentioned means comprising an element having a coil energized by the alternating current supplied to said booster and an opposing coil energized by the direct current supplied by said rotary converter, and a balancing element having a coil energized by the current flowing through said commutating field winding.

7. In combination, a rotary converter having a commutating field winding, a booster mechanically connected thereto, means for varying and reversing the field of said booster, means for varying and reversing the field produced by said commutating field winding, and means for controlling said last mentioned means, comprising a contact making device, said contact making device comprising an element having coils energized by the alternating current supplied to said booster and by the direct current supplied by said rotary converter, and a balancing element having a coil energized by the current flowing through said commutating field winding.

8. In combination, a rotary converter having a commutating field winding, a booster mechanically connected thereto, means for varying and reversing the field of said booster, means for varying and reversing the field produced by said commutating field winding, and means for controlling said last mentioned means comprising an element having a coil energized by the alternating current supplied to said booster and an opposing coil energized by the direct current supplied by said rotary converter, and a balancing element having a coil energized by the current flowing through said commutating field winding.

9. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising a contact making device, said contact making device having coils energized by the alternating current supplied to said booster and by the direct current supplied by said rotary converter.

10. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising an element having a coil energized by the alternating current supplied to said booster and an opposing coil energized by the direct current supplied by said rotary converter, and a balancing element having a coil energized by the current flowing through said commutating field winding.

11. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, solenoids controlling the movement of the arms of the double dial rheostat and a contact making device for closing the circuits of said solenoids, said contact making device having coils energized by the alternating current supplied to said booster and by the direct current supplied by said rotary converter.

12. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, solenoids controlling the movement of the arms of the double dial rheostat, and a contact making device for closing the circuits of said solenoids, said contact making device comprising an element having a coil energized by the alternating current supplied to said booster and an opposing coil energized by the direct current supplied by said rotary converter, and a balancing element having a coil energized by the current flowing through said commutating field winding.

13. In combination, a rotary converter having a commutating field winding, a booster mechanically connected thereto, means for varying the field of said booster, means for varying the field produced by said commutating field winding, and means for controlling said last mentioned means comprising a contact making device having coils energized by the alternating current and alternating voltage supplied to said booster and by the direct current supplied by said rotary converter.

14. In combination, a rotary converter having a commutating field winding, a booster mechanically connected thereto, means for varying the field of said booster, means for varying the field produced by said commutating field winding, and means for controlling said last mentioned means comprising an element having coils energized by the alternating current and the alternating voltage supplied to said booster and an opposing coil energized by the direct current supplied by said rotary converter, and a balancing element having a coil energized by the current flowing through said commutating field winding.

15. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising a contact making device, said contact making device having coils energized by the alternating current and alternating voltage supplied to said booster and by the direct current supplied by said rotary converter.

16. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising an element having coils energized by the alternating current and alternating voltage supplied to said booster and an opposing coil energized by the direct current supplied by said rotary converter, and a balancing element having a coil energized by the current flowing through said commutating field winding.

17. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage supplied to said commutating field winding, solenoids controlling the movement of the arms of the double dial rheostat, and a contact making device for closing the circuits of said solenoids, said contact making device having coils energized by the alternating current and the alternating voltage supplied to said booster, and by the direct current supplied by said rotary converter.

18. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage supplied to said commutating field winding, solenoids controlling the movement of the arms of the double dial rheostat, and a contact making device for closing the circuits of said solenoids, said contact making device comprising an element having coils energized by the alternating current and alternating voltage supplied to said booster and an opposing coil energized by the direct current supplied by said rotary converter, and a balancing element having a coil energized by the current flowing through said commutating field winding.

19. In combination, a rotary converter having a series commutating field winding and a auxiliary commutating field winding, a booster mechanically connected thereto, means for varying and reversing the field of said booster, means for varying and reversing the field produced by said auxiliary commutating field winding, and means for controlling said last mentioned means comprising a contact making device having coils energized by the alternating current supplied to said booster and by the direct current supplied by said rotary converter.

20. In combination, a rotary converter having a series commutating field winding and an auxiliary commutating field winding, a booster mechanically connected thereto, means for varying and reversing the field of said booster, means for varying and reversing the field produced by said auxiliary commutating field winding, and means for controlling said last mentioned means comprising a contact making device having coils energized by the alternating current and the alternating voltage supplied to said booster and by the direct current supplied by said rotary converter.

21. In combination, a rotory converter having a series commutating field winding and an auxiliary commutating field winding, a booster mechanically connected thereto, means for varying and reversing the field of said booster, means for varying and reversing the field produced by said auxiliary commutating field winding, and means for controlling said last mentioned means comprising an element having a coil energized by the alternating current supplied to said booster and an opposing coil energized by the direct current supplied by said rotary converter, and a balancing element having a coil energized by the current flowing through said commutating field winding.

22. In combination, a rotary converter having a series commutating field winding and an auxiliary commutating field winding, a booster mechanically connected thereto, means for varying and reversing the field of said booster, means for varying and reversing the field produced by said auxiliary commutating field winding, and means for controlling said last mentioned means comprising an element having coils energized by the alternating current and the alternating voltage supplied to said booster and an opposing coil energized by the direct current supplied by the said rotary converter, and a balancing element having a coil energized by the current flowing through said commutating field winding.

23. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, and means for controlling said double dial rheostat comprising a contact making device having coils energized by the alternating current supplied to said booster and by the direct current supplied by said rotary converter.

24. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, and means for controlling said double dial rheostat comprising a contact making device having coils energized by the alternating current and the alternating voltage supplied to said booster and by the direct current supplied by said rotary converter.

25. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, and means for controlling said double dial rheostat comprising an element having a coil energized by the alternating current supplied to said booster and an opposing coil energized by the direct current supplied by said rotary converter, and a balancing element having a coil energized by the current flowing through said commutating field winding.

26. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for controlling said double dial rheostat comprising an element having coils energized by the alternating current and the alternating voltage supplied to said booster and an opposing coil energized by the direct current supplied by the said rotary converter, and a balancing element having a coil energized by the current flowing through said commutating field winding.

27. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating field winding, solenoids controlling the movement of the arms of the double dial rheostat, and a contact making device for closing the circuits of said solenoids, said contact making device having coils energized by the alternating current supplied to said booster and by the direct current supplied by said rotary converter.

28. In combination, direct current mains, a rotary converter having a series commutating field winding and an auxiliary commutating field winding, a booster mechanically connected to said converter, means for varying and reversing the field of said booster, a double dial rheostat having arms and being connected across said means, said auxiliary commutating field winding being connected to said arms of the rheostat, means for driving said arms so as to change and reverse the voltage applied to said auxiliary commutating winding, solenoids controlling the movement of the arms of the double dial rheostat, and a contact making device for closing the circuits of said solenoids, said contact making device having coils energized by the alternating current and the alternating voltage supplied to said booster and by the direct current supplied by said rotary converter.

29. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating winding, solenoids controlling the movement of the arms of the double dial rheostat, and a contact making device for closing the circuits of said solenoids, said contact making device comprising an element having a coil energized by the alternating current supplied to said booster and an opposing coil energized by the direct current supplied by said rotary converter, and a balancing element having a coil energized by the current flowing through said commutating field winding.

30. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating field winding, solenoids controlling the movement of the arms of the double dial rheostat, and a contact making device for closing the circuits of said solenoids, said contact making device comprising an element having coils energized by the alternating current and the alternating voltage supplied to said booster and an opposing coil energized by the direct current supplied by the said rotary converter, and a balancing element having a coil energized by the current flowing through said commutating field winding.

In witness whereof, I have hereunto set my hand this 17th day of February, 1916.

JOHN B. BASSETT.

It is hereby certified that in Letters Patent No. 1,246,701, granted November 13, 1917, upon the application of John B. Bassett, of Schenectady, New York, for an improvement in "Rotary Converters," errors appear in the printed specification requiring correction as follows: Page 1, line 5, name of State, for "New Work," read *New York;* same page, line 104, after the word "all" insert the word *of;* page 7, line 59, claim 28, for the word "means" read *mains;* and that the said Letters Patent should be read with these corrections therein that the same may conform to the record of the case in the Patent Office.

Signed and sealed this 12th day of February, A. D., 1918.

[SEAL.]

J. T. NEWTON,

*Commissioner of Patents.*

Cl. 171—123.